United States Patent

Hasegawa

Patent Number: 5,667,536
Date of Patent: Sep. 16, 1997

[54] PROCESS FOR MAKING A TANTALUM CAPACITOR CHIP

[75] Inventor: Miki Hasegawa, Kyoto, Japan

[73] Assignee: Rohm Co., Ltd., Kyoto, Japan

[21] Appl. No.: 557,483

[22] Filed: Nov. 14, 1995

Related U.S. Application Data

[62] Division of Ser. No. 159,386, Nov. 30, 1993, Pat. No. 5,486,977.

[30] Foreign Application Priority Data

Dec. 8, 1992 [JP] Japan ..................... 4-328154

[51] Int. Cl.⁶ ........................................ H01G 9/15
[52] U.S. Cl. ........................................ 29/25.03
[58] Field of Search ................ 29/25.03; 306/306.1, 306/307, 523, 528, 529, 533, 540

[56] References Cited

U.S. PATENT DOCUMENTS

| | | | |
|---|---|---|---|
| 3,818,286 | 6/1974 | Gauz | 361/529 |
| 3,818,581 | 6/1974 | Vartanian et al. | 361/529 |
| 4,520,430 | 5/1985 | Long et al. | 361/529 |
| 4,791,532 | 12/1988 | Gouvernelle et al. | 361/529 |
| 4,791,539 | 12/1988 | Gouvernelle et al. | 361/529 |
| 4,945,452 | 7/1990 | Sturmer et al. | 361/529 |

FOREIGN PATENT DOCUMENTS

| | | | |
|---|---|---|---|
| 01181509 | 7/1989 | Japan . | |
| 03190210 | 8/1991 | Japan . | |
| 3-215923 | 9/1991 | Japan | 361/528 |
| 03215923 | 9/1991 | Japan . | |
| 4148522 | 5/1992 | Japan | 361/529 |
| 04148522 | 5/1992 | Japan . | |
| 04167512 | 6/1992 | Japan . | |
| 4-279020 | 10/1992 | Japan . | |
| 04279020 | 2/1993 | Japan . | |

*Primary Examiner*—John Niebling
*Assistant Examiner*—Thomas G. Bilodeau
*Attorney, Agent, or Firm*—William H. Eilberg

[57] ABSTRACT

A process is provided for making a tantalum capacitor chip which includes a tantalum chip body as well as an anode wire partially inserted into and partially projecting from the chip body. The process comprises the steps of compacting an initial divided amount of tantalum powder into an initial mass portion which is dimensionally smaller than the chip body, and compacting at least one additional divided amount of tantalum powder with the initial mass portion into the chip body. The capacitor chip thus obtained may be enclosed in a resin package to provide a surface mounting type tantalum capacitor.

6 Claims, 7 Drawing Sheets

PROCESS FOR MAKING A TANTALUM CAPACITOR CHIP

This is a division of application Ser. No. 08/159,386, filed Nov. 30, 1993 now U.S. Pat. No. 5,486,977.

BACKGROUND OF THE INVENTION

1. Field of the Invention

This invention relates to a tantalum capacitor chip of the type which comprises an anode wire partially inserted in and partially projecting from a chip body which is a compacted mass of tantalum powder. The present invention also relates to a process for making such a chip, and to a tantalum capacitor incorporating the same.

2. Description of the Prior Art

As is well known, capacitors have the function of storing and discharging electrical energy, and are widely used in designing electrical and electronical circuits. Obviously, the capacitor should preferably have such features as (1) long-life, (2) good temperature characteristics, (3) low leak current, (2) good frequency characteristics, and (5) small size with large capacity. One typical example meeting such requirements is the solid tantalum capacitor.

A prior art solid tantalum capacitor is typically made by using such a compacting apparatus as shown in FIGS. 12 and 13 of the accompanying drawings. Specifically, the compacting apparatus generally designated by reference numeral 4" comprises a die 5" having a through-bore 8", a lower punch 6" and an upper punch 7" having a wire holding bore 10". The respective punches 6", 7" are slidably movable in the through-bore 8" of the die 5" toward and away from each other.

In manufacture, a predetermined amount of tantalum powder 11" having a mesh size of e.g. 100–300 micrometers is loaded into the through-bore 8" of the die 5", with the lower punch 6" inserted into the through-bore 8", as shown in FIG. 12. Then, the upper punch 7" holding an anode wire 3" is inserted into the through-bore 8", and the lower and upper punches 6", 7" are moved toward each other up to a predetermined distance, as shown in FIG. 13.

As a result, the loaded tantalum powder is compacted into a chip body 2" with the anode wire 3" partially inserted therein and partially projecting therefrom, as illustrated in FIG. 14. The degree of compaction is such that the bulk density (apparent density) of the chip body is in the range of 6–8 g/cm³, as opposed to the specific weight of 16.6 for tantalum. Thus, the chip body is considered highly porous.

The resulting chip body 2" thus obtained is sintered in a vacuum sintering furnace. Thereafter, the chip body 2" is subjected to an oxidizing step wherein it is dipped in a strong acid solution and electrolytically oxidized to form an oxide coating ($Ta_2O_5$), which is a dielectric substance, on the individual tantalum grains of the chip body. The electrolytic oxidation occurs within the pores of the chip body according to the following reaction.

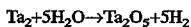

$$Ta_2 + 5H_2O \rightarrow Ta_2O_5 + 5H_2$$

After the oxidizing step described above, the chip body 2" is immersed in a solution of manganese nitrate ($Mn(NO_3)_2$) which is thermally decomposed to form a layer of manganese dioxide ($MnO_2$) which is a solid electrolyte (semiconductor) substance.

Then, the outer surfaces of the chip body 2" are subjected to a graphitizing treatment and a metalizing treatment (e.g. silver coating treatment) to form a cathode electrode. A capacitor chip is thus obtained.

Finally, the capacitor chip is formed into a final product by undergoing aftertreatments which include a soldering step (for attaching leads), a packaging step, a marking step, and etc.

The prior art process described above is disadvantageous in the following respects.

First, due to the compaction of the tantalum powder provided by the die 5" and the punches 6", 7", the density of the chip body 2" is highest at the surfaces of the chip body and progressively decreases toward the center of the chip body. Therefore, while the anode wire 3" is firmly and stably retained at a high density surface region of the chip body, the retention of the anode wire 3" is rather loose at the center of the chip body. As a result, the adhesion between the anode wire and the surrounding tantalum grains may fail to endure stresses caused by an external force for example, so that the oxide coatings of the surrounding tantalum grains may be damaged to cause an operation failure or a current leakage.

Secondly, to achieve a sufficient average density required for realizing a predetermined capacitance by a single compacting step, the density at the surfaces of the chip body 2" tends to become excessively high. Thus, when the chip body is subsequently immersed in a manganese nitrate solution for performing the semiconductor forming step, the excessively high density (namely, excessively low void ratio) at the surfaces of the chip body hinders the manganese nitrate solution from penetrating deeply into the chip body, thereby prolonging the time required for performing the semiconductor forming step. In an extreme case, the formed semiconductor substance ($MnO_2$) may prematurely clog up the surface voids or pores to completely prohibit further solution penetration into the remaining inner voids, thereby leading to a defective product.

SUMMARY OF THE INVENTION

It is, therefore, an object of the present invention to provide a process by which a tantalum capacitor chip is made wherein an anode wire is firmly and stably retained to prevent deterioration of the chip quality.

Another object of the present invention is to provide a process whereby a tantalum capacitor chip is made which enables complete and uniform semiconductor formation in the voids of the chip.

A further object of the present invention is to provide a tantalum capacitor chip made by such a process.

Still another object of the present invention is to provide a tantalum capacitor which incorporates a capacitor chip made by such a process.

According to one aspect of the present invention, there is provided a process for making a tantalum capacitor chip which includes a tantalum chip body as well as an anode wire partially inserted into and partially projecting from the chip body, the process comprising the steps of: compacting an initial divided amount of tantalum powder into an initial mass portion which is dimensionally smaller than the chip body; and compacting at least one additional divided amount of tantalum powder with the initial mass portion into the chip body.

According to a preferred embodiment of the present invention, the initial divided amount of tantalum powder is compacted to a higher degree than the additional divided amount of tantalum power. In this case, a manganese nitrate solution can be made to penetrate readily and quickly into the chip body without clogging up at the surfaces of the chip body at the time of performing a semiconductor forming step, thereby shortening the time required for the semiconductor forming step and improving the quality of the capacitor chip.

As a result of the process described above, the chip body is made to have higher density regions alternate with lower density regions, so that the anode wire can be made to penetrate through at least two of the higher density regions. Obviously, the two higher density regions provide firm and stable retention for the anode wire.

Expressed in other words, the chip body obtained by the process of the present invention is made to have a plurality of integrated mass portions which have been divisionally compacted, so that the anode wire can be made to extend at least from one mass portion to another. The respective mass portions may be cross-sectionally different with one arranged around another. Alternatively, the respective mass portions may be cross-sectionally equal with one arranged above another.

According to another aspect of the present invention, the tantalum capacitor is provided which incorporates the capacitor chip made by the above-described process.

Other objects, features and advantages of the present invention will be fully understood from the following detailed description given with reference to the accompanying drawings.

DETAILED DESCRIPTION OF THE PREFERRED EMBODIMENTS

Figure 1:
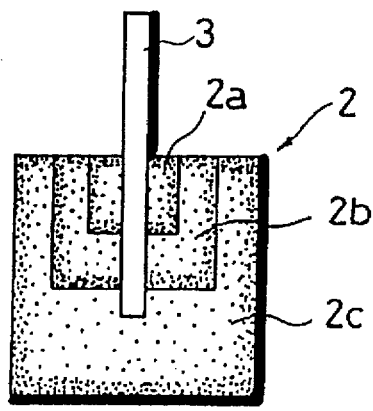
FIG. 1 is a sectional view showing a tantalum capacitor chip embodying the present invention.

FIG. 1 of the accompanying drawings shows a capacitor chip according to a first embodiment of the present invention. The configuration of the chip body may be optional. For example, the chip body may be cylindrical, parallelepiped or square.

The illustrated capacitor chip comprises a tantalum chip body 2 and a tantalum anode wire 3 partially inserted in and partially projecting from the chip body 2. The chip body 2 is a compacted mass of tantalum powder which includes a smallest-sized first mass portion (inner mass portion) 2a, a medium-sized second mass portion (intermediate mass portion) 2b and a largest-sized third mass portion (outer mass portion) 2c. The respective mass portions 2a–2c of the chip body 2 are formed by stepwise or divisional compacting, so that the density in the chip body increases and decreases alternately and repetitively.

The chip body 2 described above is formed in the following manner.

Figure 2:
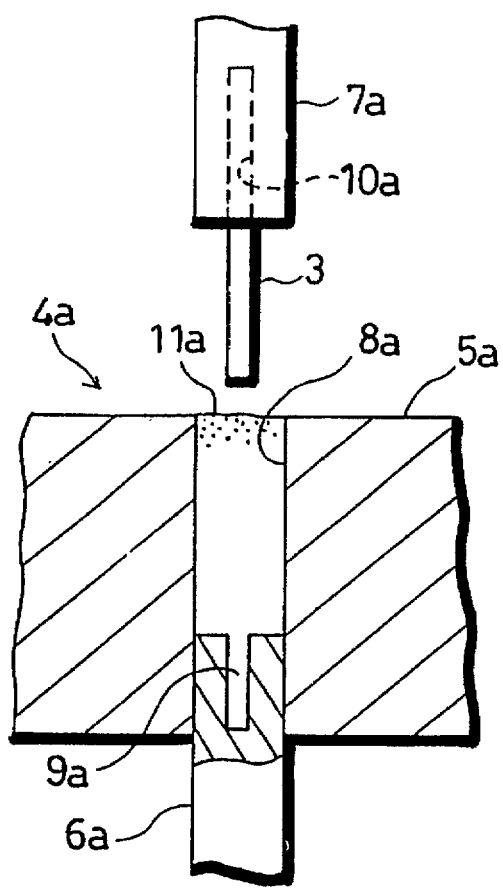
FIGS. 2 to 7 are sectional views showing the successive steps for making the capacitor chip illustrated in FIG. 1.

In a first compacting step, use is made of a first compacting apparatus 4a which mainly comprises a first die 5a, a first lower punch 6a and a first upper punch 7a, as shown in FIG. 2. The die 5a has a through-bore 8a which has a cross section smaller than the final cross section of a chip body 2 (see FIG. 1). The lower punch 6a is slidably insertable into the through-bore 8a of the die 5a vertically from below and has a wire receiving bore 9a for receiving the lower end of an anode wire 3 at the time of compacting. Similarly, the upper punch 7a is slidably insertable into the through-bore 8a vertically from above and has a wire holding bore 10a for retaining the upper end of the anode wire 3.

Figure 3:
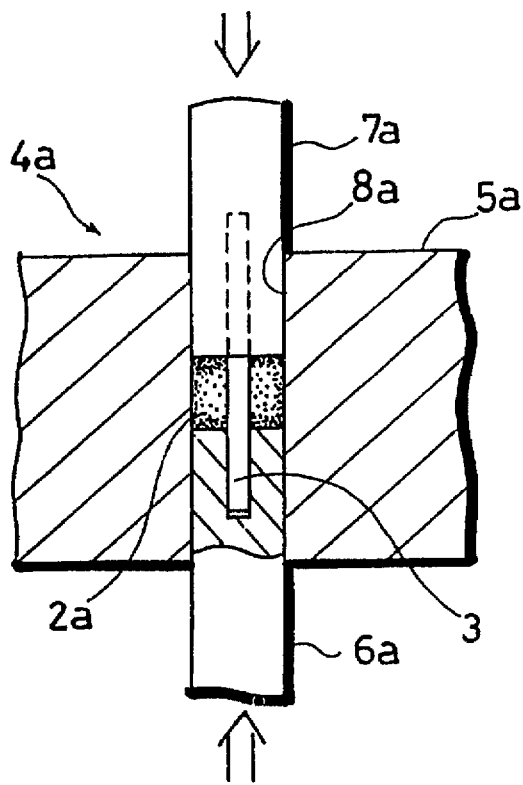

With the lower punch 6a inserted into the through-bore 8a of the die 5a, a predetermined amount of tantalum powder 11a is loaded into the through-bore 8a, as shown in FIG. 2. Then, the upper punch 7a holding the anode wire 3 is inserted into the through-bore 8a, and the lower and upper punches 6a, 7a are moved toward each other up to a predetermined distance, as shown in FIG. 3. Such an operation results in formation of a smallest-sized first mass portion 2a.

Figure 4:
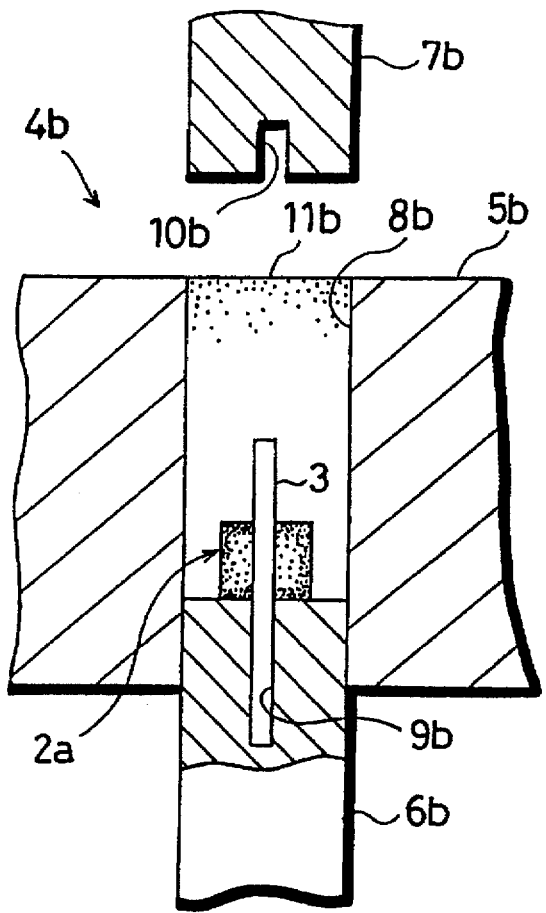

A second compacting step is performed by using a second compacting apparatus 4b which mainly comprises a second die 5b, a second lower punch 6b and a second upper punch 7b, as shown in FIG. 4. The second die 5b has a through-bore 8b which has a cross section larger than the cross section of the first mass portion 2a but still smaller than the final cross section of the chip body (FIG. 1). The second lower punch 6b is slidably insertable into the through-bore 8b of the second die 5b vertically from below and has a wire receiving bore 9b for receiving the lower end of the anode wire 3. Similarly, the second upper punch 7b is slidably insertable into the through-bore 8b vertically from above and has a wire receiving bore 10b for receiving the upper end of the anode wire 3.

Figure 5:
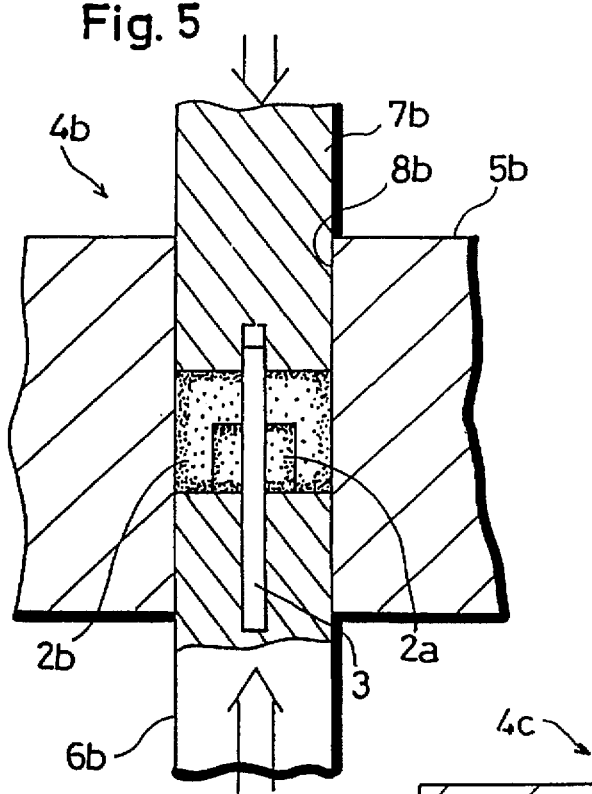

In the second compacting step, the first mass portion 2a previously formed is placed, upon inversion, on the second lower punch 6b with the lower end (previously the upper end) of the anode wire 3 inserted into the wire receiving bore 9b of the second lower punch 6b, as shown in FIG. 4. Then, the second lower punch 6b is inserted into the through-bore 8b of the second die 5b, and a predetermined amount of tantalum powder 11b is loaded into the through-bore 8b, as also shown in FIG. 4. Next, the second upper punch 7b is inserted into the through-bore 8b, and the second lower and upper punches 6b, 7b are moved toward each other up to a predetermined distance, as shown in FIG. 5. As a result, a medium-sized second mass portion 2b is formed around the smallest-sized first mass portion 2a.

Figure 6:
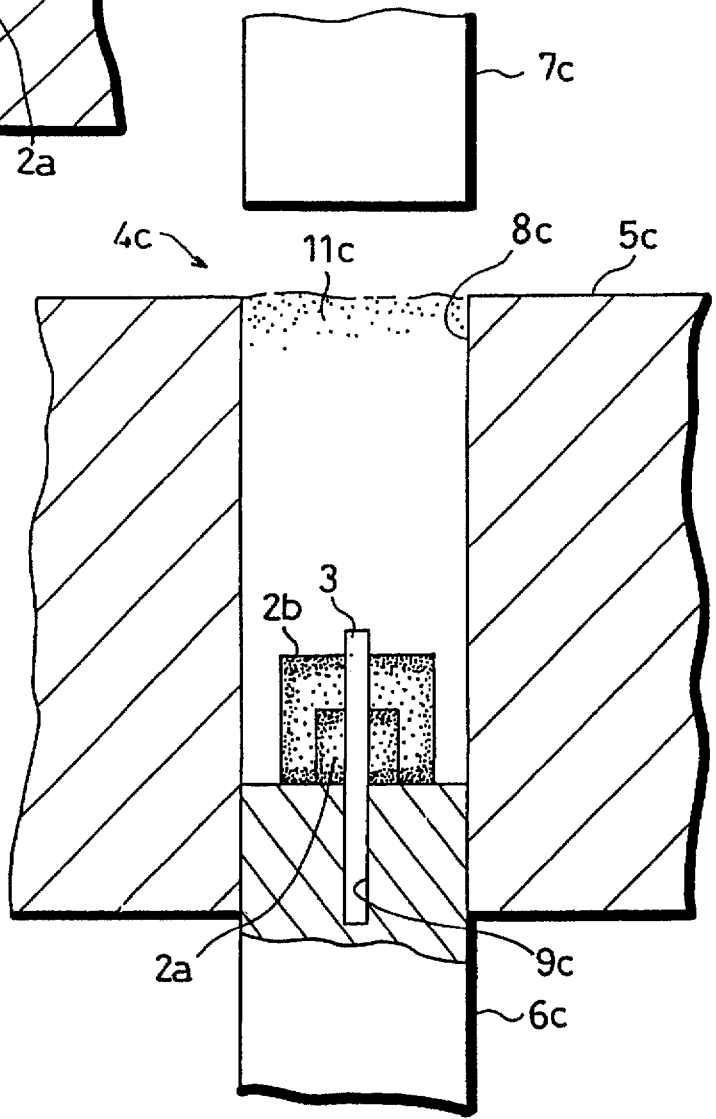

A third compacting apparatus 4c is used for performing a third compacting step, as shown in FIG. 6. The third compacting apparatus 4c mainly comprises a third die 5c, a third lower punch 6c and a third upper punch 7c. The third die 5c has a through-bore 8c which has a size equal to the final size of the chip body (FIG. 1). The third lower punch 6c is slidably insertable into the through-bore 8c of the third die 5c vertically from below and has a wire receiving bore 9c for receiving the lower end of the anode wire 3. The third upper punch 7b is slidably insertable into the through-bore 8b vertically from above but has no wire receiving bore.

In the third compacting step, the combination of the first and second mass portions 2a, 2b previously formed is placed on the third lower punch 6c with the lower end of the anode wire 3 inserted into the wire receiving bore 9c of the third lower punch 6c, as shown in FIG. 6. Then, the third lower punch 6c is inserted into the through-bore 8c of the third die 5c, and a predetermined amount of tantalum powder 11c is loaded into the through-bore 8c, as also shown in FIG. 6.

Figure 7:
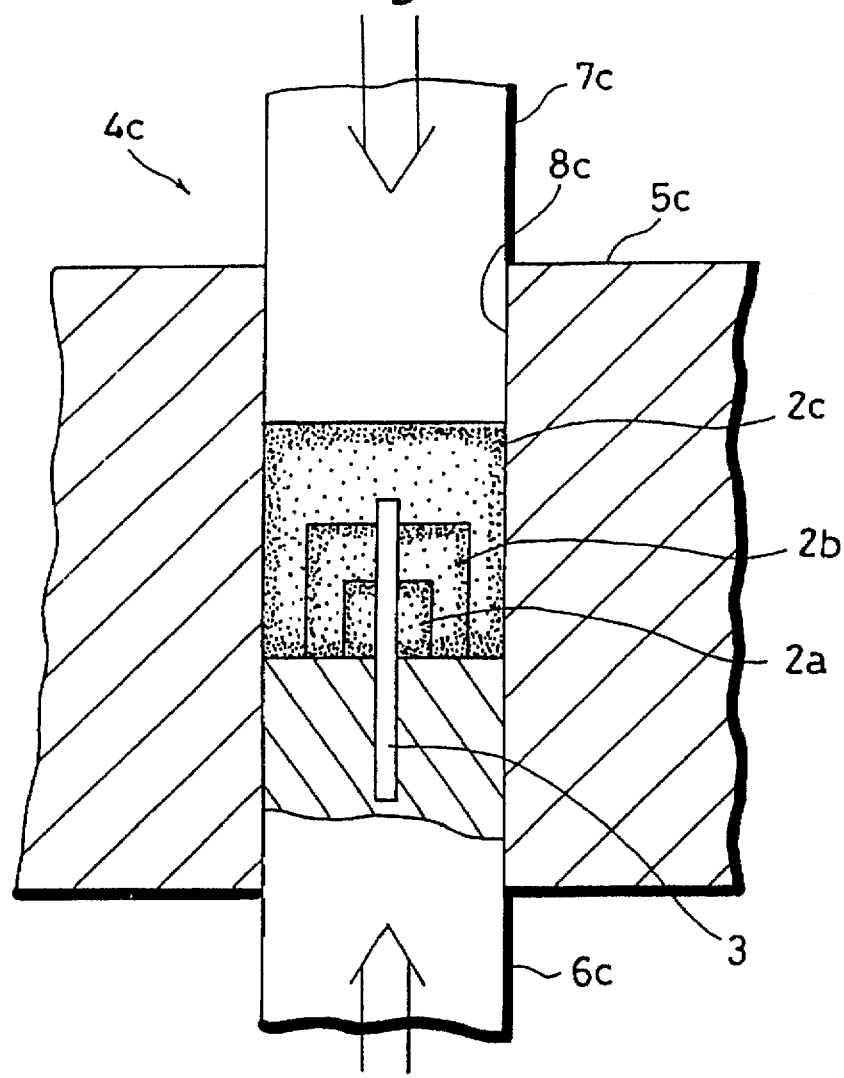

Next, the third upper punch ?c is inserted into the through-bore 8c, and the third lower and upper punches 6c, 7c are moved toward each other up to a predetermined distance, as shown in FIG. 7. As a result, a largest-sized third mass portion 2c is formed around the medium-sized second mass portion 2b.

The compact or chip body 2 (FIG. 1) thus obtained is then subjected to subsequent treatments which include a sintering step, an oxidizing step, a semiconductor forming step, a graphitizing step and a metalizing step.

In the sintering step, the compact 2 is placed in a sintering furnace and sintered at high vacuum. As a result, a porous sintered compact is obtained.

Figure 8:
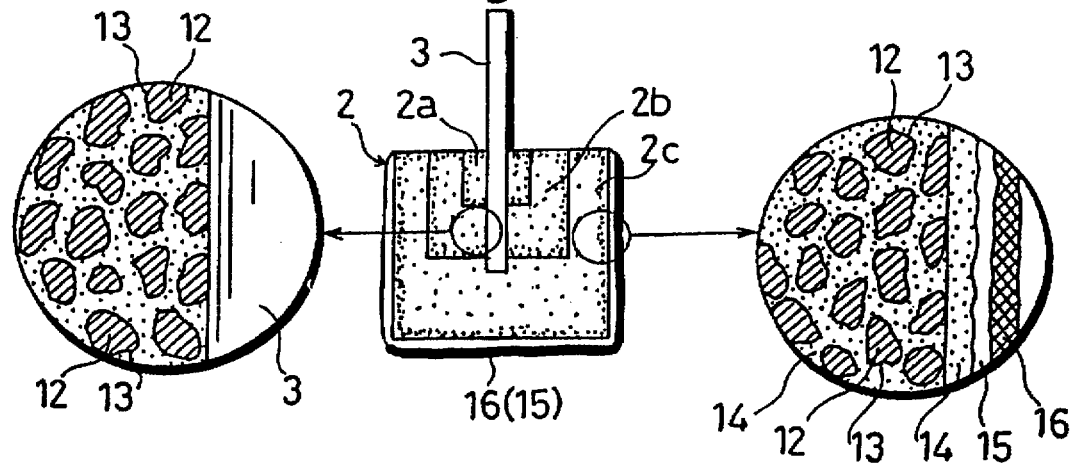
FIG. 8 is a sectional view showing the same capacitor chip which have undergone subsequent treatments.

In the oxidizing step, the porous sintered compact 2 is immersed in a strong acid solution under application of a voltage. As a result, tantalum grains 12 within the compact 2 are equally made to have a thin surface coating 13 of tantalum pentoxide ($Ta_2O_5$) which works as a dielectric substance electrically separating between the anode and the cathode, as shown in FIG. 8. The overall coating surface area of the tantalum grains 12 determines the capacitance of the tantalum capacitor.

The semiconductor forming step is performed to fill the voids of the porous compact 2 (which has undergone the oxidizing step) with a semiconductor substance 14, as also shown in FIG. 8. For this purpose, the porous compact 2 is immersed in a solution of manganese nitrate for example, and a portion of the manganese nitrate solution occupying the voids of the compact 2 is caused to thermally decompose into manganese dioxide ($MnO_2$). Such an operation is repeated plural times until the voids of the compact 2 are fully filled with manganese dioxide which is a semiconductor substance.

The graphitizing step is performed to form a graphite layer 15 (FIG. 8) on the outer surfaces of the compact 2 except for one surface from which the anode wire 3 projects out. The metalizing step results in the formation of a silver layer 16 (FIG. 9) covering the graphite layer 15. The silver layer 16 serves as the cathode of the capacitor.

Figure 9:
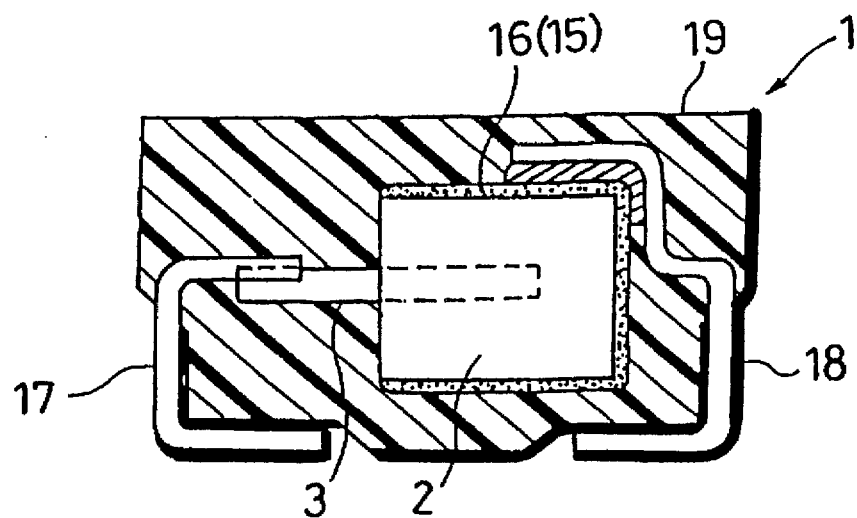
FIG. 9 is a sectional view showing a solid tantalum capacitor incorporating the capacitor chip of FIG. 8.

As illustrated in FIG. 9, the anode wire 3 is electrically connected to an anode lead 17, whereas the cathode silver layer 16 of the chip body 2 is electrically connected to a cathode lead 18. The chip body 2 together with the anode wire 3 and part of the leads 17, 18 is enclosed in a resin package 19 which may be made of a thermosetting resin such as epoxy. The leads 17, 18 have respective exposed portions which are bent under the resin package 19 to facilitate mounting to a printed circuit board (not shown). In this way, a product solid tantalum capacitor 1 is obtained which is of the surface mounting type.

According to the embodiment described above, the chip body 2 having the first-third mass portions 2a–2c is formed stepwise or divisionally by performing the first-third compacting steps. Thus, the chip body 2 is made to have higher density regions, which are alternate with lower density regions, not only at the surfaces of the chip body but also deeper within the chip body, as clearly shown in FIGS. 1, 7 and 8. Such a structure of the chip body is advantageous for the following reasons.

First, the anode wire 3 can be made to penetrate through a plurality of higher density regions of the chip body 2. Apparently, the penetrated higher density regions provide firm and stable retention of the anode wire 3 at least at two positions. Thus, even if an external force acts on the anode wire 3, it is possible to prevent or restrain the anode wire 3 from positionally deviating, thereby keeping the anode wire 3 adhered to the surrounding tantalum grains 12 (see FIG. 8). Indeed, a positional deviation of the anode wire 3 may result in breaking the surface oxide coatings 13 of the surrounding tantalum grains 12, which may allow current leakage. Such a problem can be effectively prevented by the stepwise or divisional compacting operation.

Figure 14:
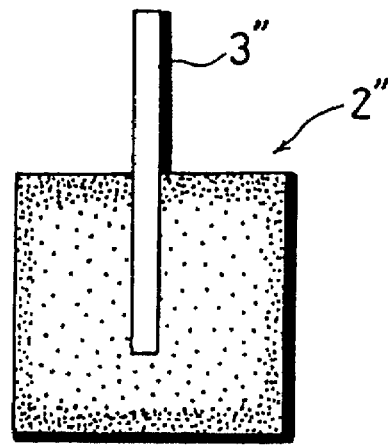
FIG. 14 is a sectional view showing the prior art capacitor chip obtained by the method of FIG. 13.

Secondly, due to the stepwise or divisional compacting operation, the surface regions of the chip body 2, though having a higher density than the lower density regions of the same chip body, need not have such a high density as required for a prior art chip body (see FIG. 14) which is prepared by a single compacting step. Thus, when the chip body 2 is subsequently immersed in a manganese nitrate solution for performing the semiconductor forming step, it is much easier and faster for the manganese nitrate solution to penetrate deeply into the chip body in comparison with the prior art. Indeed, with the prior art, an extremely high density (namely, extremely low void ratio) at the surfaces of the chip body will hinder solution penetration and may result in premature clogging of the surface voids or pores by the formed semiconductor substance ($MnO_2$) to completely prohibit further solution penetration, thereby leading to a defective product. Such a problem can be avoided by performing the stepwise or divisional compacting operation.

For effective penetration of the manganese nitrate solution, the first mass portion 2a should preferably have a higher average density (namely, a higher degree of compaction) than the second mass portion 2b which, in turn, should preferably have a higher average density (namely, a higher degree of compaction) than the third mass portion 2c. Such a density distribution or adjustment is possible because of the divisional compacting operation. Of course, the average density of the chip body 2 as a whole should be set at a predetermined value.

Figure 10:
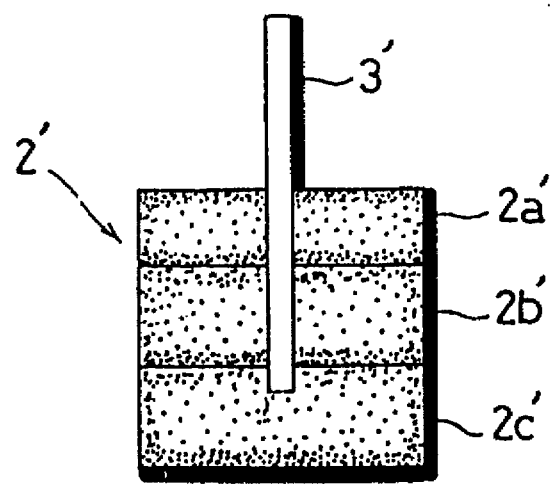
FIG. 10 is a sectional view showing another tantalum capacitor chip embodying the present invention.

FIG. 10 shows a capacitor chip according to a second embodiment of the present invention.

The capacitor chip of this embodiment comprises a tantalum chip body 2' and a tantalum anode wire 3' partially inserted in and partially projecting from the chip body 2'. The chip body 2' is a compacted mass of tantalum powder which includes first to third mass portions 2a'–2c' stacked one on another. The chip body 2' having such a laminate structure is formed also by stepwise or divisional compacting with the use of a die-punch type compacting apparatus.

Figure 11:
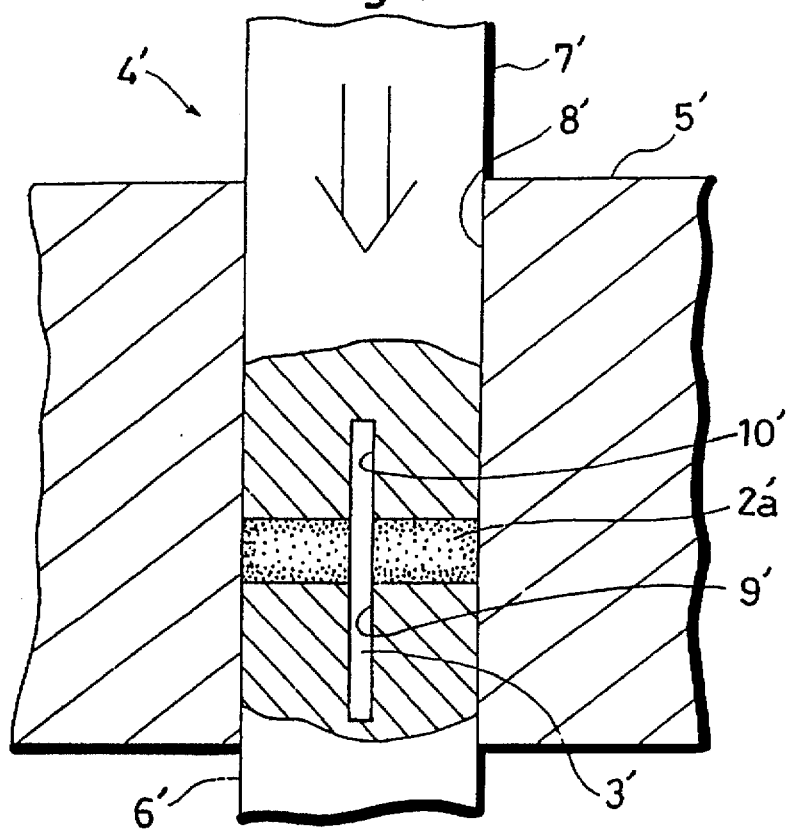
FIG. 11 is a sectional view showing the method for making the capacitor chip of FIG. 10.
Figure 12:
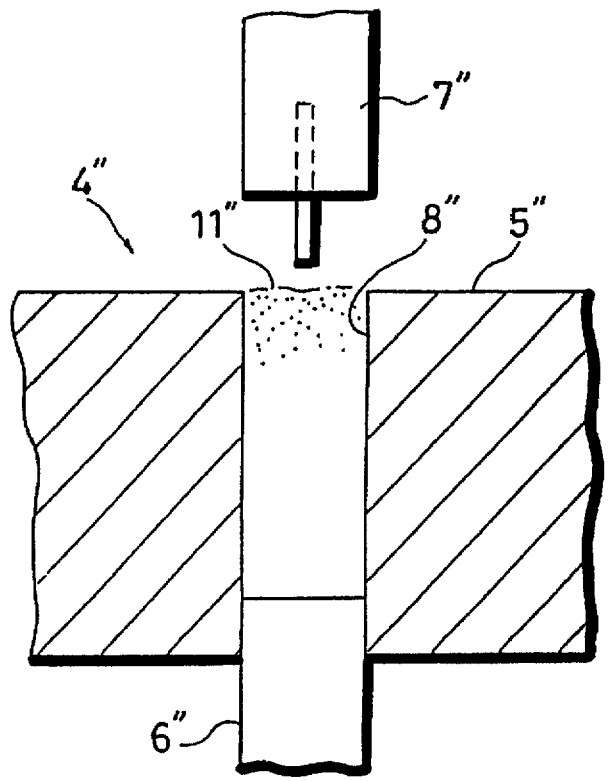
FIGS. 12 and 13 are sectional views showing a prior art method for making a tantalum capacitor chip.
Figure 13:
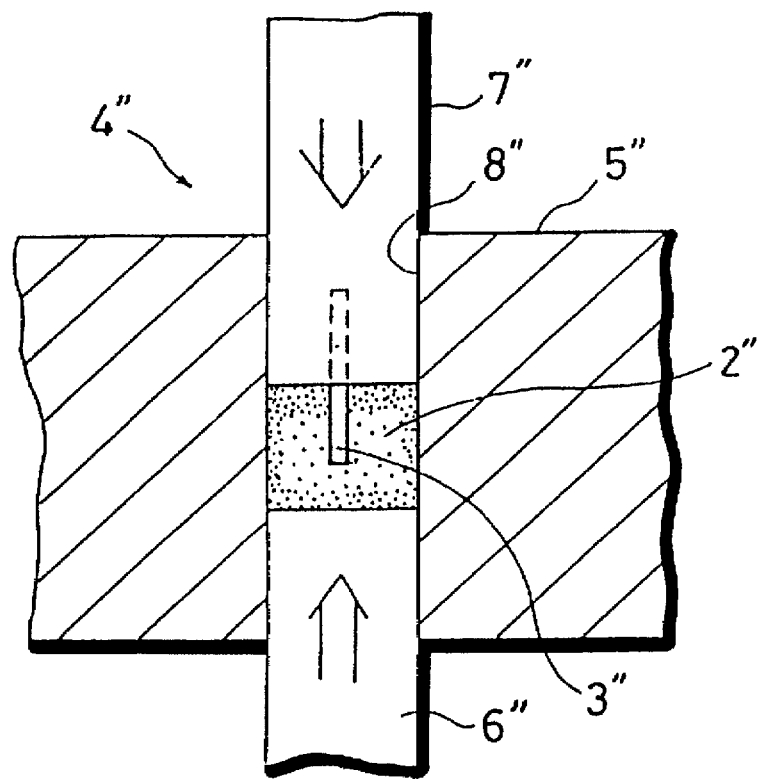

Specifically, as shown in FIG. 11, the compacting apparatus generally designated by reference numeral 4' mainly comprises a die 5', a lower punch 6' and a upper punch 7'. The die 5' has a through-bore 8' which has substantially the same cross section as a chip body 2' (see FIG. 10) to be formed. The lower punch 5' is slidably insertable into the through-bore 8' of the die 5' vertically from below and has a wire receiving bore 9' for receiving the lower end of an anode wire 3' at the time of compacting. Similarly, the upper punch 7' is slidably insertable into the through-bore 8' vertically from above and has a wire receiving bore 10' for receiving the upper end of the anode wire 3'.

With the lower punch 5' inserted into the through-bore 8' of the die 5' and receiving the lower end of the anode wire 3', a predetermined amount of tantalum powder is loaded into the through-bore 8'. Then, the upper punch 7' is inserted into the through-bore 8', and the lower and upper punches 6', 7' are moved toward each other up to a predetermined distance, as shown in FIG. 11. Such a compacting step results in formation of a first mass portion 2a', and similar compacting steps are repeated to form second and third mass portions 2b', 2c' (FIG. 10).

The chip body 2' thus prepared is subjected to subsequent treatments which include a sintering step, an oxidizing step, a semiconductor forming step, a graphitizing step and a metalizing step, in the same manner as for the chip body 2 of the first embodiment (see FIG. 8). Further, after these treatments, the chip body 2' is packaged in the same manner as the chip body of the first embodiment (see FIG. 9).

According to the second embodiment, the chip body 2' having the first-third mass portions 2a'–2c' is formed by stepwise or divisional compacting. As a result, the chip body 2' is made to have higher density regions in multiple stages alternately with lower density regions, as clearly shown in FIG. 10. Therefore, the second embodiment has substantially the same advantages as described for the first embodiment.

The present invention being thus described, it is obvious that the same may be varied in many ways. For instance, the number of the divisional compacting steps is optional. Further, the sintering step may be performed after every compacting step. Moreover, the solid tantalum capacitor may be of the non-package type. Such variations are not to be regarded as a departure from the spirit and scope of the present invention, and all such modifications as would be obvious to those skilled in the art are intended to be included within the scope of the following claims.

I claim:

1. A process for making a tantalum capacitor chip which includes a chip body as well as an anode wire partially inserted into and partially projecting from the chip body, the process comprising the steps of:

compacting an initial divided amount of tantalum powder, together with the anode wire, into an initial mass portion which is dimensionally smaller than the chip body, the anode wire completely penetrating through the initial mass portion to project from two opposite faces thereof; and compacting at least one additional divided amount of tantalum powder with the initial mass portion into the chip body.

2. The process according to claim 1, wherein the initial mass portion has a smaller cross section than the chip body.

3. The process according to claim 1, wherein the initial mass portion has an equal cross section as the chip body but a smaller thickness than the chip body.

4. The process according to claim 1, wherein the initial divided amount of tantalum powder is compacted to a higher degree than said at least one additional divided amount of tantalum power.

5. The process according to claim 1, wherein the chip body is subjected to subsequent treatments which include a sintering step, an oxidizing step, a semiconductor forming step, a graphitizing step and a metalizing step.

6. The process according to claim 1, wherein the anode wire is made of tantalum.

* * * * *